United States Patent [19]
Caimi et al.

[11] Patent Number: 4,914,460
[45] Date of Patent: Apr. 3, 1990

[54] APPARATUS AND METHODS OF DETERMINING DISTANCE AND ORIENTATION

[75] Inventors: Frank M. Caimi, Vero Beach; Robert F. Tusting, Ft. Pierce, both of Fla.

[73] Assignee: Harbor Branch Oceanographic Institution Inc., Ft. Pierce, Fla.

[21] Appl. No.: 55,338

[22] Filed: May 29, 1987

[51] Int. Cl.$^4$ .......................... G03B 17/08; H04N 7/18
[52] U.S. Cl. ...................................... 354/64; 354/162; 358/107; 901/47
[58] Field of Search ............................... 354/162–164, 354/64, 65, 73, 75, 76; 356/371, 388, 394, 1, 4, 375, 376; 358/99, 107; 364/559; 901/47

[56] References Cited

U.S. PATENT DOCUMENTS

| | | | |
|---|---|---|---|
| 3,187,185 | 12/1960 | Milnes | 356/1 |
| 3,347,130 | 10/1967 | Seibel | 356/371 |
| 3,435,744 | 4/1969 | Stimson | 354/403 |
| 3,446,555 | 5/1969 | Kahn | 356/5 |
| 4,105,990 | 8/1978 | Rines et al. | 367/96 |
| 4,313,654 | 2/1982 | Matsui et al. | 354/403 |
| 4,335,944 | 6/1982 | Marshall | 354/64 |
| 4,381,144 | 4/1983 | Breslau | 354/64 |
| 4,447,896 | 5/1984 | Rines | 367/96 |
| 4,724,480 | 2/1988 | Hecker et al. | 358/107 |

Primary Examiner—L. T. Hix
Assistant Examiner—David M. Gray
Attorney, Agent, or Firm—Carroll F. Palmer

[57] ABSTRACT

A method for determining position of and/or for positioning an object relative to both (a) its distance to a surface and (b) the orientation of its longitudinal axis to such surface involves emitting in a first plane toward such surface a plurality of first beams of coherent light from a first position adjacent the object so such first plane is at an acute angle relative to the object's longitudinal axis and the first beams of light project forward of the object to cross such longitudinal axis at such acute angle thereby forming on the surface a pattern of the illuminations of the first beams. Simultaneously, second beams are similarly emitted in a second plane toward the surface from a second opposed position adjacent the object to thereby form on the surface a pattern of illuminations of the second beams. The patterns of illuminations on such surface of the first and second beams, typically two parallel lines of light spots, are compared with a predetermined illumination pattern to enable the distance of the object to the surface and the orientation of the longitudinal axis of the object relative to the surface to be determined. Apparatus for conducting such methods is also disclosed.

10 Claims, 1 Drawing Sheet

APPARATUS AND METHODS OF DETERMINING DISTANCE AND ORIENTATION

BACKGROUND OF THE INVENTION

1. Field of the Invention

This invention relates broadly to methods and apparatus for determining position of and/or for positioning an object relative to both (a) its distance to a surface and (b) the orientation of its longitudinal axis to such surface. More particularly, it concerns such methods and apparatus especially suited for accurately positioning cameras, video recorders, or other objects relative to surfaces in a submarine location.

2. Description of the Prior Art

There are many situations in which the location of an object relative to both (a) its distance to another object or to a surface and (b) its orientation to such object or surface must be determined in order to (1) accurately position the object relative to the surface, (2) to project something from the object to the surface or other object and (3) for many other reasons. This invention is specifically directed to methods and apparatus useful in those particular situations in which an object, e.g., a camera, a recording system, an imaging device, analysis instrument, etc., must be accurately positioned relative to a surface under conditions that present acute problems in determining the distance and orientation of the object relative to the surface, particularly in submarine locations. However, it is contemplated that these methods and apparatus will be put to other uses than in submarine environments.

A great number of underwater visual recordings are made with photographic or video cameras which have limited remote controls. This is particularly true of deep-sea camera systems where camera lens opening and focus are preset and the photographer must somehow arrange for the subject to be at the correct distance, within the field of view and properly oriented with respect to the viewing system at the time of exposure.

One approach is providing better control in submarine photography would be to incorporate the ranging features of advanced, above the surface cameras. Such cameras use a variety of techniques to obtain proper exposure conditions for control. The most common is a triangulation arrangement which superimposes the images received by a pair of space optical receivers and provides automatic, mechanical adjustment of the lens until the received images are coincident. Microelectronics are used to perform the image comparison and thereby provide automatic focusing (see U.S. No. 4,435,744 and 4,313,654).

Other advanced surface cameras use microprocessor based optical-image analyzers to determine correct focus. Also, sonar systems are used in some cameras.

The optical systems of the surface cameras generally use infrared light beams with reflected light intensity, image analysis and triangulation. Unfortunately, the devices and techniques developed for surface cameras are not directly transferable to submarine camera systems. Differences, between the physical properties of air and water result in major differences in the propagation of light and sound in the two media. Additionally, spurious material and signals can cause may "false" exposures to occur with submarine photography while this is not a serious consideration in use of surface cameras. Therefore, a camera system which depends on the propagation of energy waves for operation must be designed for the medium in which it is to be used.

Extensive development work has occurred relative to submarine photography, e.g., see "Underwater Photography—Scientific and Engineering Applications", compiled by Paul Ferris Smith, Van Nostrand Reinhold Company, 422 p., 1984. Such work has included use of (a) optical triggering of underwater cameras, e.g., see U.S. No. 3,446,555 and pp. 223-228, "Deep Sea Photography", J. B. Hersey, Editor, The Johns Hopkins Press, 1967, and (b) sonar techniques, e.g., see U.S. No. 4,105,990; 4,335,944; 4,381,144, 4,447,896 and copending U.S. patent application Ser. No. 842,139, now U.S. Pat. No. 4,707,094, filed Mar. 21, 1986.

Nothwitstanding the extensive prior work and developments with surface and submarine camera systems, substantial improvements are needed for the submarine systems.

OBJECTS

A principal object of the invention is the provision of new methods and apparatus for determining position of and/or for positioning an object relative to both (a) its distance to a surface and (b) its orientation with respect to such surface.

Further objects include the provision of:

1. Improvements in such apparatus and methods particularly suited for making visual recordings in a submarine environment.

2. Improvements in such apparatus and methods that inform a submarine recording system when a submarine surface is in the camera's field of view and that the distance to the surface is suitable for in-focus photography.

3. Improvements in such apparatus and methods that provide information as to submarine surface relief or topography.

4. Such recording systems that can verify that the camera to object distance is within the camera's depth of field.

5. Such recording systems that can verify that the camera is positioned at the proper angle relative to the surface to be recorded.

Other objects and further scope of applicability of the present invention will become apparent from the detailed description given hereinafter; it should be understood, however, that the detailed description, while indicating preferred embodiments of the invention, is given by way of illustration only, since various changes and modifications within the spirit and scope of the invention will become apparent to those skilled in the art from this detailed description.

SUMMARY OF THE INVENTION

The objects are accomplished, in part, in accordance with the invention by the provision of methods for determining the distance of an object to a surface and the orientation of the longitudinal axis of the object relative to the surface.

Such new methods involve emitting, in a first plane in a spaced fan array from an emission source toward the surface, a plurality of first beams of light from a first position adjacent the object so the first plane is at an acute angle A relative to the object's longitudinal axis and the first beams of light project foward of the object whereby the first plane crosses such object longitudinal axis at the acute angle A, thereby forming a surface a pattern of the illuminations (spots) of the first beams.

Simultaneously, there is emitted, in a second plane in a spaced fan array from another emission source toward the surface, a plurality of second beams of light so the number of the second beams and their spacing are substantially equal to the first beams. The emission of second beams are from a second position adjacent the object and diametrically opposed to the first position so the second plane is at the acute angle A relative to the object longitudinal axis and the second beams of light project forward of the object whereby the second plane crosses the object longitudinal axis at the acute angle A at substantially the same position as the first plane and so the intersection of the second plane with the first plane at such same position defines a line that is perpendicular to the object longitudinal axis, thereby forming on the surface a pattern of illuminations of the second beams.

As the pattern of illuminations of the projected first and second beams are created on the datum surface they are compared visually or electronically with a predetermined illumination pattern thereby enabling the distance of the object to a surface and the orientation of the longitudinal axis of the object relative to the surface to be determined.

If the surface is flat and oriented perpendicular to the illumination and viewing system (IVS), the patterns of illuminations of the first and second beams are two parallel lines of substantially equal length defined by two series of spaced apart spots of light and the predetermined illumination pattern is also two parallel lines of substantially equal length defined by two series of spaced apart spots. If the surface is not oriented perpendicular to the IVS, then the patterns of illuminations will be angled, rather than parallel, straight lines of spots. Further, if the surface is not flat, then the patterns will be irregularly shaped, non-parallel lines of spaced spots.

The objects are further accomplished by new methods of positioning an object relative to a surface at a desired distance of the object to the surface and at a desired orientation of the longitudinal axis of the object relative to the surface which involves the formation of patterns of illuminations and their comparison with a predetermined illumination pattern, as explained above, and, additionally, adjusting movement of the object relative to the surface to obtain the best average conformance of the patterns of illuminations on the surface to the predetermined illumination pattern.

In preferred embodiments of the invention, the comparing of the patterns of illuminations with the predetermined illumination pattern is done by electronic means connected to an image detector onto which the pattern of illuminations are projected.

The objects are further accomplished by new apparatus for determination of the distance of an object to a surface and the orientation of the longitudinal axis of the object relative to the surface.

Such new apparatus comprises (A) a first laser unit capable of emitting a plurality of first beams of coherent light lying spaced apart in a first plane, (B) a second laser unit capable of emitting a plurality of second beams of coherent light lying spaced apart in a second plane with the number of the second beams and their spacing being substantially equal to the first beams, (C) means to fix the first laser unit adjacent the object with its longitudinal axis at an acute angle A relative to the object longitudinal axis so that the first beams of light emitted thereby project foward of the object with the first plane crossing the object longitudinal axis at the acute angle A, (D) means to fix the second laser unit adjacent the object opposed to the first laser unit with its longitudinal axis at that acute angle A relative to the object longitudinal axis so that the second beams of light emitted thereby project foward of the object with the second plane crossing the object's longitudinal axis at substantially the same position as the first plane and so the intersection of the second plane with the first plane at the same position defines a line that is perpendicular to the object longitudinal axis, (E) means to energize the first and second laser units to cause the first and second beams of the coherent light to project onto the surface and (F) means to compare the pattern of illuminations on the surface of the projected first and second beams with a predetermined illumination pattern.

Additionally, the objects are accomplished by the provision of apparatus for positioning an object relative to a surface at a desired distance of the object to the surface and at a desired orientation of the longitudinal axis of the object relative to the surface which comprises, in addition to items (A)–(F) explained above, (G) control means to adjust movement of the object relative to the surface to obtain the best average conformance of the pattern of illuminations on the surface to a predetermined illumination pattern.

In preferred embodiments of the invention, the control means comprises a video camera, electronic means to prescribe the predetermined illumination pattern on a light receptive image detector and optical means to project the patterns of illuminations of the first and second beams onto the light receptive image detector. Advantageously, other electronic means is connected to the image detector to continuously compare the patterns of illuminations projected thereon to the predetermined illumination pattern and the object being positioned is a photographic camera.

BRIEF DESCRIPTION OF THE DRAWINGS

A more complete understanding of the invention may be had by reference to the accompanying drawings in which.

DESCRIPTION OF THE PREFERRED EMBODIMENTS

Figure 1:
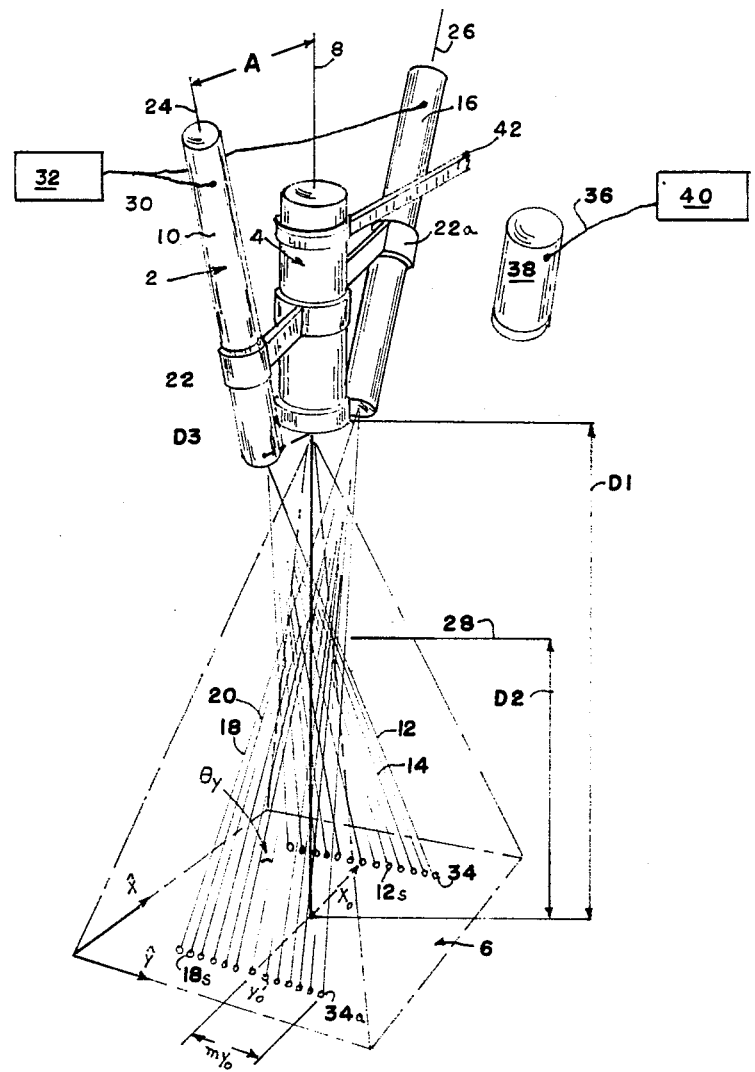
FIG. 1 is a diagrammatic view of apparatus constructed in accordance with the invention.

Referring in detail to the drawings, in which identical parts are identically marked, the invention concerns apparatus 2 for determinations of the distance of an object 4 to a surface 6 and the orientation of the longitudinal axis 8 of the object relative to the surface 6.

Apparatus 2 has a first laser unit 10 capable of emitting a plurality of first beams 12 of coherent light lying spaced apart in a first plane 14.

It also has a second laser unit 16 capable of emitting a plurality of second beams 18 of coherent light lying spaced apart in a second plane 20.

The support means 22 fixes the first laser unit adjacent the object 4 with its longitudinal axis 24 at an acute angle A relative to the object longitudinal axis 8 so that the first beams 12 project forward of the object 4 with the first plane 14 crossing the object longitudinal axis at the acute angle A and a position P.

Support means 22a fixes the second laser unit 16 adjacent the object 4 opposed to the first laser unit 10 with its longitudinal axis 26 at the acute angle A relative to the object longitudinal axis 8 so that the second beams 18 of light project forward of the object 4 with the second plane 20 crossing the object longitudinal axis 8 at substantially the same position P as the first plane 14 and so the intersection of the second plane with the first plane 14 defines a line 28 that is perpendicular to the object longitudinal axis 8.

Electrical conduit means 30 connects first and second laser units 10 and 12 to power source means 32 to cause the first and second beams 12 and 18 of coherent light to project patterns of illuminations 34 and 34a respectively onto the surface 6.

Electrical conduit means 36 connects the video unit 38 with electronic integrated circuit means 40 to compare the patterns of illuminations 34 and 34a with a predetermined illumination pattern (not shown) which is programmed into circuit means 40. The circuit means is capable of analyzing the video signals obtained from viewing the illuminations 34 and 34a to determine when the position of object 4 produces the best average conformance of the observed illuminations to the predetermined illumination pattern.

In the embodiment of the invention in which the new apparatus 2 is used to position the object 4 relative to the surface 6, there is control means 42 to adjust movement of the oject 4 relative to the surface 6 to obtain the best average conformance of the patterns of illuminations 34 and 34a to the predetermined illumation pattern (not shown).

In a method of the invention, for positioning the object 4 relative to surface 6 at a desired distance $D_1$ from the surface 6 and at a desired orientation angle C to the surface 6, one simultaneously emits at the acute angle A relative to the object longitudinal axis 8 the first and second beams 14 and 18 to project forward of the object 4 so the second plane 20 crosses the object longitudinal axis at the acute angle A at substantially the same position as the first plane 14 and so the intersection of these planes defines the line 28 that is perpendicular to the object longitudinal axis 8. This forms on the surface 6 patterns of illuminations 34 and 34a. The object 4 is moved by control means 42 relative to the surface 6 to obtain the best average conformance of the patterns of illuminations 34 and 34a on the surface 6 and, in turn on an image detector (not shown) in the video unit 38 to the predetermined illumination pattern imposed on the video image detector by the electronic circuit means 40.

A specific application of the new methods and apparatus of the invention is the repeated positioning of a remote submarine vehicle (not shown) carrying a the apparatus 2 including a 70 mm film camera (object 4) above the ocean floor (surface 6). Two fan-shaped arrays 14 and 20 of beams 12 and 18 are produced using diffraction from holographic or ruled gratings (not shown) and are positioned to cross at an angle A the longitudinal axis 8 of the camera 4 at a distance D2 above the surface 6. The distance from the camera lens focus to the surface 6 is D1 and the offset distance from the center of the camera 4 to each of the lasers 10 and 16 is D3. Two lines 34 and 34a of separate beam spots 12s and 18s are produced on the surface 6 separated by a distance X along the $\hat{x}$ direction. The nth order spot of each array 14 and 20 is separated from the center spot by a distance Y in the $\hat{y}$ direction which can be expressed by the formula:

$$Y = ny_o = [D1 + (x+D3)^2]^{\frac{1}{2}} \tan B$$

where B is the angular separation of the separated light beams, $y_o$ is the incremental distance between spots and n is the number of spots counting from the center spot out on one side (nth diffracted order).

The two lines 34 and 34a are separated by the distance 2X in the $\hat{x}$ direction which can be expressed by the formula:

$$2X = \frac{2 D_2 \cdot D_3}{(D_1 - D_2)} = 2D_2 \cdot \tan A$$

where A is the angle A.

The embodiments of the invention in which an exclusive property or privilege is claimed are defined as follows:

1. Apparatus for determination of the distance of a submarine object to a submarine surface and the orientation of the longitudinal axis of said object relative to said surface which comprises:

a first laser unit capable of emitting a plurality of first spot beams of light lying spaced apart in a first plane, a second laser unit capable of emitting a plurality of second spot beams of light lying spaced apart in a second plane with the number of said second spot beams and their spacing being substantially equal to said first spot beams, means to fix said first laser unit adjacent said object with its longitudinal axis at an acute angle A relative to said object longitudinal axis so that said first spot beams of light emitted thereby project forward of said object with said first plane crossing said object longitudinal axis at said acute angle A, means to fix said second laser unit adjacent said object opposed to said first laser unit with its longitudinal axis at said acute angle A relative to said object longitudinal axis so that said second spot beams of light emitted thereby project forward of said object with said second plane crossing said object longitudinal axis at substantially the same position as said first plane and so the intersection of said second plane with said first plane at said same position defines a line that is perpendicular to said object longitudinal axis and is located between said object and said surface, means to energize said first and second laser units to cause said first and second spot beams of light to project onto said surface and means to compare said pattern of illuminations on said surface of said projected first and second spot beams with a predetermined illumination pattern.

2. Apparatus for positioning a submarine object relative to a submarine surface at a desired distance of said object to said surface and at a desired orientation of the longitudinal axis of said object relative to said surface which comprises:

a first laser unit capable of emitting a plurality of first spot beams of light lying spaced equidistantally apart in a first plane, a second laser unit capable of emitting a plurality of second spot beams of light lying spaced equidistantally apart in a second plane with the number of said second spot beams and their spacing being substantially equal to said first spot beams, means to fix said first laser unit adjacent said object with its longitudinal axis at an acute angle A relative to said object longitudinal axis so that said first spot beams of light emitted thereby project forward of said object with said first plane crossing said object longitudinal axis at said acute angle A, means to fix said second laser unit adjacent said object opposed to said first laser unit with its longitudinal axis at said acute angle A relative to said object longitudinal axis so that said second spot beams of light emitted thereby project forward of said object with said second plane crossing said object longitidinal axis at substantially the same position as said first plane and so the intersection of said second plane with said first plane at said same position defines a line that is perpendicular to said object longitudinal axis and is located between said object and said surface, means to energize said first and second laser units to cause said first and second spot beams of light to emit therefrom and project onto said surface to form a pattern of illuminations of said projected spot beams thereon and control means to adjust movement of said object relative to said surface to obtain the best average conformance of said pattern of illuminations on said surface to a predetermined illumination pattern.

3. The apparatus of claim 2 wherein said control means comprises a video camera.

4. The apparatus of claim 2 wherein said control means further comprises optical means to project said pattern of illuminations onto said light receptive image detector and electronic means to create said predetermined illumination pattern thereon for comparison with said optical means projected pattern.

5. The apparatus of claim 4 having electronic means connected to said image detector to continuously compare said pattern of illuminations projected thereon to said predetermined illumination pattern.

6. The apparatus of claim 1 wherein said object is a photographic camera.

7. A method for determining the distance of a submarine object to a submarine surface and the orientation of the longitudinal axis of said object relative to said surface which comprises:

emitting in a first plane in a second fan array from a point source toward said surface a plurality of first spot beams of light from a first position adjacent said object so said first plane is at an acute angle A relative to said object longitudinal axis and said first spot beams of light project forward of said object whereby said first plane crosses said object longitudinal axis at said acute angle A, thereby forming on said surface a pattern of the illuminations of said first spot beams, emitting in a second plane in a spaced fan array from a point source toward said surface a plurality of second spot beams of light so the number of said second spot beams and their spacing are substantially equal to said first spot beams, said emission of second spot means being from a second position adjacent said object and opposed to said first position so said second plane is at said acute angle A relative to said object longitudinal axis and said second spot beams of light project forward of said object whereby said second plane crosses said object longitudinal axis at said acute angle A at substantially the same position as said first plane and so the intersection of said second plane with said first plane at said same position defines a line that is perpendicular to said object longitudinal axis and is located between said object and said surface, thereby forming on said surface a pattern of illuminations of said second spot beams, and comparing said patterns of illuminations on said surface of said projected first and second spot beams with a predetermined illumination pattern thereby enabling the distance of said object to a surface and the orientation of the longitudinal axis of said object relative to said surface to be determined.

8. A method for positioning a submarine object relative to a submarine surface at a desired distance of said object to said surface and at a desired orientation of the longitudinal axis of said object relative to said surface which comprises:

emitting in a first plane in a spaced fan array from a point source toward said surface a plurality of first spot beams of light from a first position adjacent said object so said first plane is at an acute angle A relative to said object longitudinal axis and said first spot beams of light project forward of said object whereby said first plane crosses said object longitudinal axis at said acute angle A, thereby forming on said surface a pattern of the illuminations of said first spot beams, emitting in a second plane in a spaced fan array from a point source toward said surface a plurality of second spot beams of light so the number of said second spot beams and their spacing are substantially equal to said first spot beams, said emission of second spot beams being from a second position adjacent said object and diametrically opposed to said first position so said second plane is at said acute angle A relative to said object longitudinal axis and said second spot beams of light project forward of said object whereby said second plane crosses said object longitudinal axis at said acute angle A at substantially the same position as said first plane and so the intersection of said second plane with said first plane at said same position defines a line that is perpendicular to said object longitudinal axis and is located between said object and said surface, thereby forming on said surface a pattern of illuminations of said second spot beams, comparing said patterns of illuminations on said surface of said projected first and second spot beams with a predetermined illumination pattern, and adjusting movement of said object relative to said surface to obtain the best average conformation of said patterns of illuminations on said surface to said predetermined illumination pattern.

9. The method of claim 8 wherein said comparing of said patterns of illuminations with said predetermined illumination pattern is done by electronic means connected to an image detector onto which said pattern of illuminations is projected.

10. The method of claim 8 wherein said patterns of illuminations of said first and second spot beams are of two parallel lines of substantially equal length defined by two series of spaced apart spots of light and said predetermined illumination pattern is representative of two other, but similar, parallel lines of spaced apart spots.

* * * * *